(12) United States Patent
Ziv

(10) Patent No.: US 10,142,025 B2
(45) Date of Patent: Nov. 27, 2018

(54) HIGH-DIRECTIVITY DIRECTIONAL COUPLER, AND RELATED METHODS AND SYSTEMS

(71) Applicant: Corning Optical Communications Wireless Ltd, Airport City (IL)

(72) Inventor: Roi Yosy Ziv, Ramat Gan (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 0 days.

(21) Appl. No.: 15/490,028

(22) Filed: Apr. 18, 2017

(65) Prior Publication Data
US 2018/0302163 A1 Oct. 18, 2018

(51) Int. Cl.
| | |
|---|---|
| *H04B 10/00* | (2013.01) |
| *H04B 10/2575* | (2013.01) |
| *H01Q 1/48* | (2006.01) |
| *H01Q 21/06* | (2006.01) |
| *H01Q 21/00* | (2006.01) |
| *H04B 10/80* | (2013.01) |

(Continued)

(52) U.S. Cl.
CPC ......... *H04B 10/25753* (2013.01); *H01Q 1/48* (2013.01); *H01Q 21/0087* (2013.01); *H01Q 21/065* (2013.01); *H04B 10/801* (2013.01); *H04W 52/52* (2013.01); *H04W 88/085* (2013.01)

(58) Field of Classification Search
CPC .......... H04B 10/2575; H04B 10/25752; H04B 10/25753; H04B 10/25751; H01P 5/184; H01P 5/185; H01P 5/183; H01P 5/187

USPC ... 398/115, 116, 117, 66, 67, 68, 69, 70, 72, 398/158, 150, 135, 136, 137, 138, 139; 333/116, 109, 238, 112, 115, 117, 118
See application file for complete search history.

(56) References Cited

U.S. PATENT DOCUMENTS

| | | |
|---|---|---|
| 5,373,266 A | 12/1994 | Lenzing et al. |
| 5,689,217 A | 11/1997 | Gu et al. |

(Continued)

FOREIGN PATENT DOCUMENTS

WO  2015063757 A1  5/2015

OTHER PUBLICATIONS

International Searching Authority Invitation to Pay Additional Fees PCT/IL2018/050420 dated Sep. 7, 2018.

*Primary Examiner* — Hanh Phan
(74) *Attorney, Agent, or Firm* — C. Keith Montgomery

(57) ABSTRACT

Embodiments of the disclosure relate to a high-directivity directional coupler, and related methods and systems. The high-directivity directional coupler includes a first microstrip and a second microstrip disposed parallel to the first microstrip. The high-directivity directional coupler inherently generates an even mode current and an odd mode current in the second microstrip. The second microstrip provides a linear forward path for conveying the even mode current and a non-linear return path for conveying the odd mode current. The non-linear return path is longer than the linear forward path to compensate for phase velocity difference between the even mode current and the odd mode current. As a result, the odd mode current and the even mode current in the second microstrip can destructively cancel out each other, thus rendering high-directivity without compromising other performance aspects of the high-directivity directional coupler.

21 Claims, 12 Drawing Sheets

(51) Int. Cl.
*H04W 52/52* (2009.01)
*H04W 88/08* (2009.01)

(56) References Cited

U.S. PATENT DOCUMENTS

| | | |
|---|---|---|
| 8,121,646 B2 | 2/2012 | Oren et al. |
| 8,258,889 B2 | 9/2012 | Fluhrer |
| 9,054,759 B2 * | 6/2015 | Watanabe ............. H03F 1/3247 |
| 9,318,788 B2 * | 4/2016 | Spokoinyi ............... H01P 5/185 |
| 9,509,133 B2 | 11/2016 | Saig et al. |
| 9,548,708 B2 | 1/2017 | Reuven |
| 2008/0191814 A1 * | 8/2008 | Boulet .................... H01P 5/184 |
| | | 333/116 |
| 2010/0171564 A1 | 7/2010 | Yamamoto et al. |
| 2011/0122912 A1 | 5/2011 | Benjamin et al. |
| 2011/0268449 A1 * | 11/2011 | Berlin .............. H04B 10/25753 |
| | | 398/115 |
| 2011/0273242 A1 * | 11/2011 | Totani .................... H01P 5/185 |
| | | 333/116 |
| 2012/0105170 A1 | 5/2012 | Noori et al. |
| 2016/0352541 A1 | 12/2016 | Ziv |

* cited by examiner

HIGH-DIRECTIVITY DIRECTIONAL COUPLER, AND RELATED METHODS AND SYSTEMS

BACKGROUND

The disclosure relates generally to a directional coupler, and more particularly to a high-directivity directional coupler that can be provided in a remote unit in a wireless distribution system (WDS).

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of distributed antenna systems (DASs). DASs include remote units configured to receive and transmit communications signals to client devices within the antenna range of the remote units. DASs can be particularly useful when deployed inside buildings or other indoor environments where the wireless communications devices may not otherwise be able to effectively receive radio frequency (RF) signals from a source.

In this regard, FIG. 1 illustrates distribution of communications services to remote coverage areas 100(1)-100(N) of a wireless distribution system (WDS) provided in the form of a DAS 102, wherein 'N' is the number of remote coverage areas. These communications services can include cellular services, wireless services, such RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote units 104(1)-104(N) connected to a central unit 106 (e.g., a head-end equipment, a head-end controller, or a head-end unit). The central unit 106 may be communicatively coupled to a signal source 108, for example a base transceiver station (BTS) or a baseband unit (BBU). In this regard, the central unit 106 receives downlink communications signals 110D from the signal source 108 to be distributed to the remote units 104(1)-104(N). The remote units 104(1)-104(N) are configured to receive the downlink communications signals 110D from the central unit 106 over a communications medium 112 to be distributed to the respective remote coverage areas 100(1)-100(N) of the remote units 104(1)-104(N). Each of the remote units 104(1)-104(N) may include an RF transmitter/receiver and a respective antenna 114(1)-114(N) operably connected to the RF transmitter/receiver to wirelessly distribute the communications services to client devices 116 within the respective remote coverage areas 100(1)-100(N). The remote units 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by the amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

The remote units 104(1)-104(N) may include power amplifiers 118(1)-118(N), respectively, for amplifying the downlink communications signals 110D to specific power levels before transmitting the downlink communications signals 110D to the client devices 116. As such, it may be necessary to calibrate the power amplifiers 118(1)-118(N) during installation and/or a configuration phase of the DAS 102 to ensure that the downlink communications signals 110D are amplified properly. In a non-limiting example, it is possible to calibrate each of the power amplifiers 118(1)-118(N) using a directional coupler that includes an input port, an output port, a coupled port, and an isolated port.

To calibrate a selected power amplifier among the power amplifiers 118(1)-118(N), the input port of the directional coupler may be coupled to the selected power amplifier to receive a respective downlink communications signal outputted by the selected power amplifier. Test equipment, such as a power detector, may be coupled to the coupled port of the directional coupler to receive a coupled signal that is proportional to the respective downlink communications signal received at the input port. Thus, by measuring a power level of the coupled signal, it may be possible to determine a corresponding power level of the downlink communications signal received at the input port. Accordingly, it may be possible to configure the selected power amplifier to output the respective downlink communications signal at a desired power. In this regard, performance merits of the directional coupler, such as insertion loss, coupling ripple, and directivity, can determine the result of power amplifier calibration, and thus the performance of the remote units 104(1)-104(N).

No admission is made that any reference cited herein constitutes prior art. Applicant expressly reserves the right to challenge the accuracy and pertinency of any cited documents.

SUMMARY

Embodiments of the disclosure relate to a high-directivity directional coupler, and related methods and systems. In a non-limiting example, directivity is an indication of how well a directional coupler can discriminate between forward and return signals. In examples discussed herein, a high-directivity directional coupler is a directional coupler capable of rendering more than fifteen decibels (15 dB) in directivity. The high-directivity directional coupler includes a first microstrip and a second microstrip disposed parallel to the first microstrip. The high-directivity directional coupler inherently generates an even mode current and an odd mode current in the second microstrip. The second microstrip provides a linear forward path for conveying the even mode current and a non-linear return path for conveying the odd mode current. The non-linear return path is longer than the linear forward path to compensate for phase velocity difference between the even mode current and the odd mode current. As a result, the odd mode current and the even mode current in the second microstrip can destructively cancel out each other, thus rendering high-directivity without compromising other performance aspects of the high-directivity directional coupler.

In this regard, in one aspect, a high-directivity directional coupler is provided. The high-directivity directional coupler includes a substrate. The high-directivity directional coupler also includes a ground plane disposed underneath the substrate. The high-directivity directional coupler also includes an input port configured to receive an input signal. The high-directivity directional coupler also includes an output port configured to output the received input signal as an output signal. The high-directivity directional coupler also includes a coupled port configured to output a coupled signal proportional to the input signal. The high-directivity directional coupler also includes an isolated port configured to provide isolation to the input signal and the coupled signal. The high-directivity directional coupler also includes a first microstrip disposed above the substrate. The first microstrip is configured to convey the input signal from the input port to the output port. The high-directivity directional coupler also includes a second microstrip disposed above the substrate parallel to the first microstrip. The second microstrip is configured to provide a linear forward path for conveying an even mode current from the coupled port to the ground plane. The second microstrip is also configured to provide a non-linear return path longer than the linear forward path for conveying an odd mode current in an opposite direction from the even mode current.

In another aspect, a method for fabricating a high-directivity directional coupler is provided. The method includes providing a substrate. The method also includes providing a ground plane underneath the substrate. The method also includes providing an input port configured to receive an input signal. The method also includes providing an output port configured to output the received input signal as an output signal. The method also includes providing a coupled port configured to output a coupled signal proportional to the input signal. The method also includes providing an isolated port configured to provide isolation to the input signal and the coupled signal. The method also includes disposing a first microstrip above the substrate. The first microstrip is configured to convey the input signal from the input port to the output port. The method also includes disposing a second microstrip above the substrate parallel to the first microstrip. The second microstrip is configured to provide a linear forward path for conveying an even mode current from the coupled port to the ground plane. The second microstrip is also configured to provide a non-linear return path longer than the linear forward path for conveying an odd mode current in an opposite direction from the even mode current.

In another aspect, a wireless distribution system (WDS) is provided. The WDS includes a plurality of remote units. The plurality of remote units is configured to receive and convert a plurality of downlink digital communications signals into a plurality of downlink radio frequency (RF) communications signals for distribution to client devices. The plurality of remote units is also configured to receive a plurality of uplink RF communications signals from the client devices and convert the plurality of uplink RF communications signals into a plurality of uplink digital communications signals. The WDS also includes a central unit. The central unit is configured to distribute the plurality of downlink digital communications signals to the plurality of remote units. The central unit is also configured to receive the plurality of uplink digital communications signals from the plurality of remote units. At least one selected remote unit among the plurality of remote units includes a high-directivity directional coupler. The high-directivity directional coupler includes a substrate. The high-directivity directional coupler also includes a ground plane disposed underneath the substrate. The high-directivity directional coupler also includes an input port configured to receive an input signal. The high-directivity directional coupler also includes an output port configured to output the received input signal as an output signal. The high-directivity directional coupler also includes a coupled port configured to output a coupled signal proportional to the input signal. The high-directivity directional coupler also includes an isolated port configured to provide isolation to the input signal and the coupled signal. The high-directivity directional coupler also includes a first microstrip disposed above the substrate. The first microstrip is configured to convey the input signal from the input port to the output port. The high-directivity directional coupler also includes a second microstrip disposed above the substrate parallel to the first microstrip. The second microstrip is configured to provide a linear forward path for conveying an even mode current from the coupled port to the ground plane. The second microstrip is also configured to provide a non-linear return path longer than the linear forward path for conveying an odd mode current in an opposite direction from the even mode current.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to a high-directivity directional coupler, and related methods and systems. In a non-limiting example, directivity is an indication of how well a directional coupler can discriminate between forward and return signals. In examples discussed herein, a high-directivity directional coupler is a directional coupler capable of rendering more than fifteen decibels (15 dB) in directivity. The high-directivity directional coupler includes a first microstrip and a second microstrip disposed parallel to the first microstrip. The high-directivity directional coupler inherently generates an even mode current and an odd mode current in the second microstrip. The second microstrip provides a linear forward path for conveying the even mode current and a non-linear return path for conveying the odd mode current. The non-linear return path is longer than the linear forward path to compensate for phase velocity difference between the even mode current and the odd mode current. As a result, the odd mode current and the even mode current in the second microstrip can destructively cancel out each other, thus rendering high-directivity without compromising other performance aspects of the high-directivity directional coupler.

Before discussing exemplary aspects of a high-directivity directional coupler, and related methods and systems, an overview of a directional coupler and corresponding figure of merits are first provided with references to FIGS. 2A-2F. The discussion of specific exemplary aspects of a high-directivity directional coupler, and related methods and systems, starts below with reference to FIG. 3A.

Figure 1:
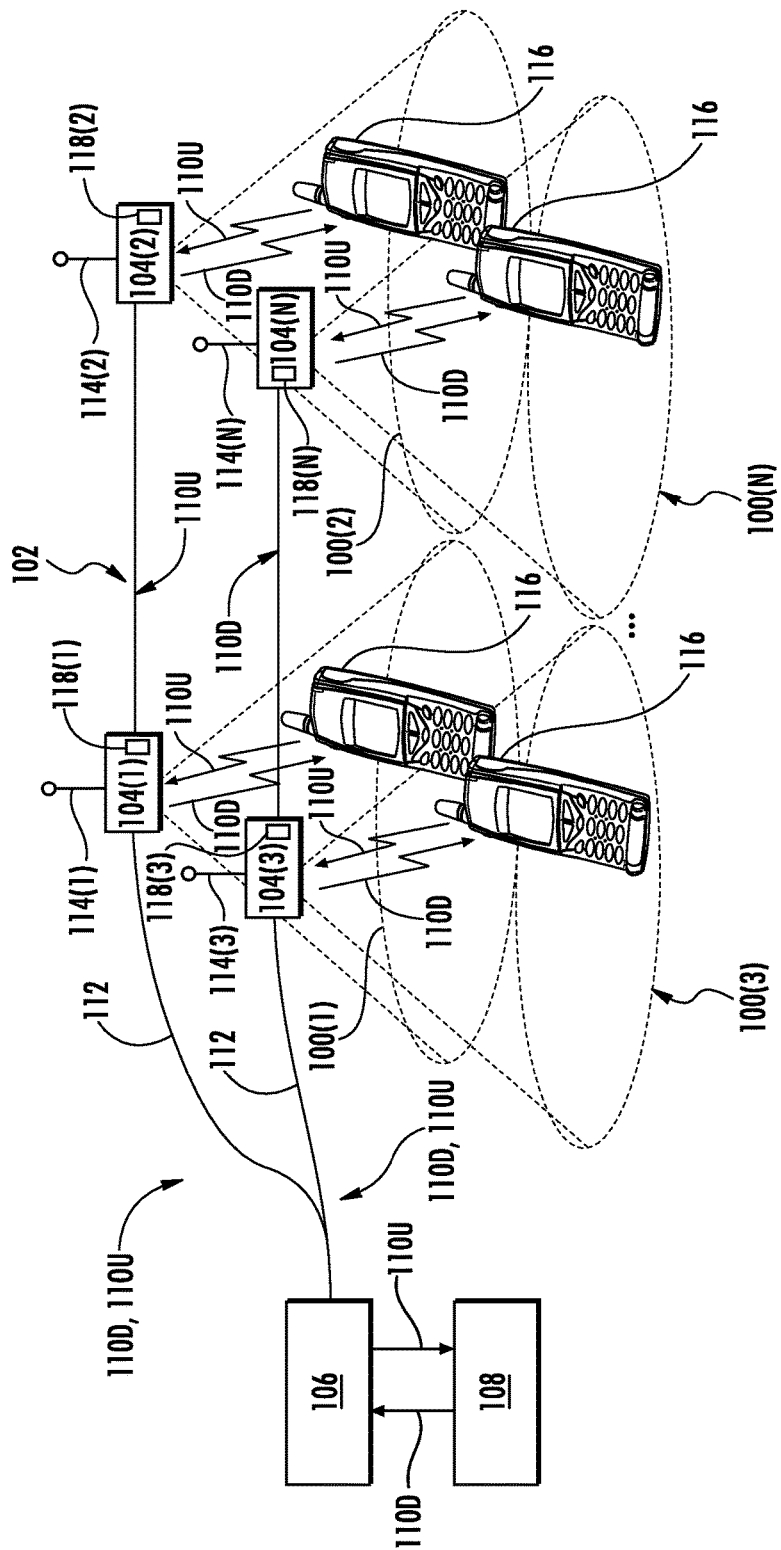
FIG. 1 is a schematic diagram of an exemplary wireless distribution system (WDS), which may be a distributed antenna system (DAS) for example.
Figure 2A:
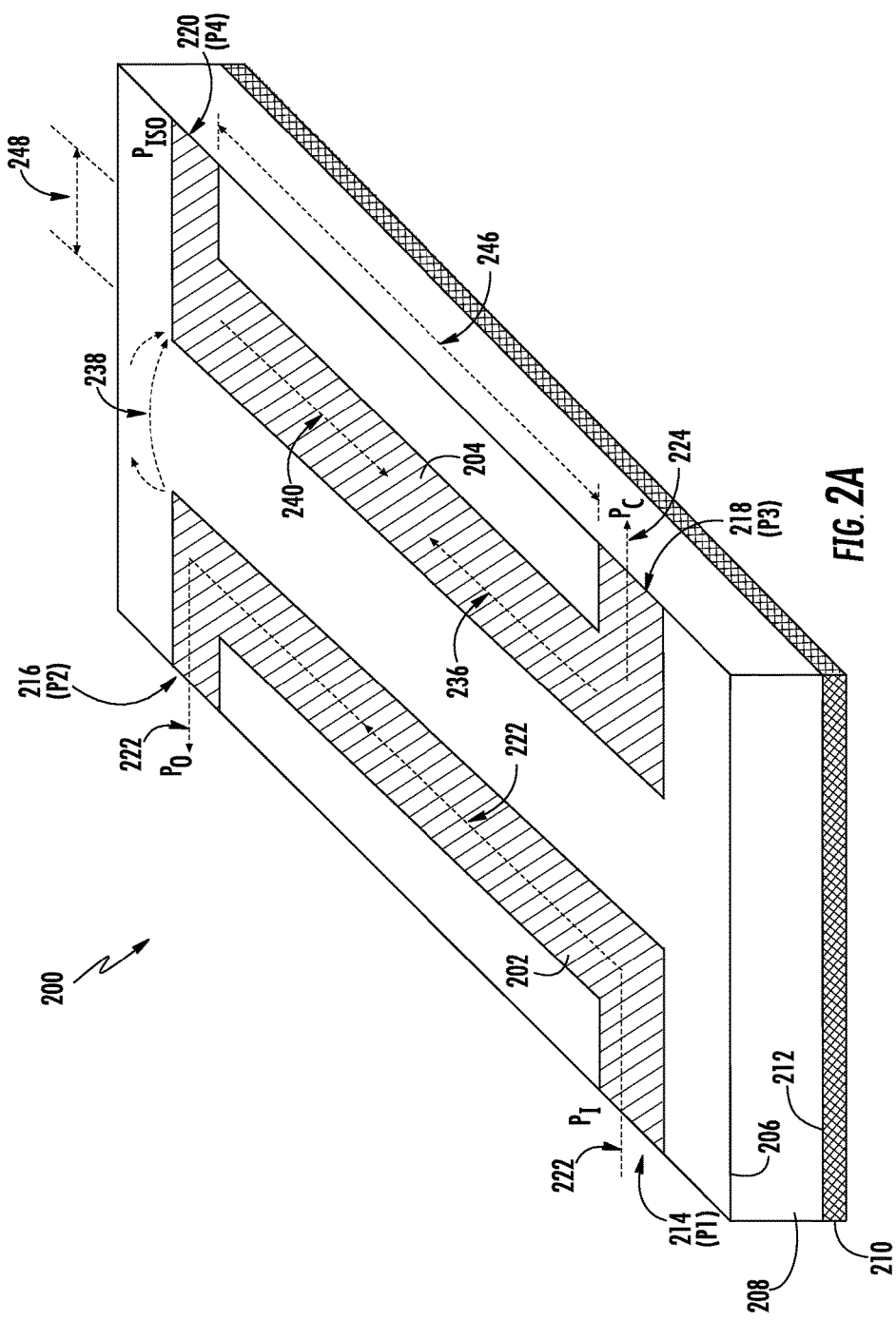
FIG. 2A is a schematic diagram of an exemplary directional coupler.

In this regard, FIG. 2A is a schematic diagram of an exemplary directional coupler 200. The directional coupler 200 includes a first microstrip 202 and a second microstrip 204 that are disposed in parallel on a top surface 206 of a substrate 208. The directional coupler 200 also includes a ground plane 210 disposed on a bottom surface 212 of the substrate 208. In this regard, the ground plane 210 is disposed on an opposite side of the substrate 208 from the first microstrip 202 and the second microstrip 204. The directional coupler 200 includes an input port (P1) 214, an output port (P2) 216, a coupled port (P3) 218, and an isolated port (P4) 220. In this regard, the directional coupler 200 is also known as a four-port directional coupler. The first microstrip 202 couples the input port (P1) 214 with the output port (P2) 216. The second microstrip 204 couples the coupled port (P3) 218 with the isolated port (P4) 220.

The directional coupler 200 may receive a signal 222 at an input power $P_I$ via the input port (P1) 214 and output the signal 222 at an output power $P_O$ via the output port (P2) 216. The directional coupler 200 can output a coupled signal 224 at a coupled power $P_C$ via the coupled port (P3) 218. The output power $P_O$ and the coupled power $P_C$ are both proportional to the input power $P_I$. The directional coupler 200 is configured to split the input power $P_I$ between the output power $P_O$ and the coupled power $P_C$ in such a way that the output power $P_O$ is substantially higher than the coupled power $P_C$. As such, it is possible to determine the input power $P_I$ of the signal 222 at the input port (P1) 214 by observing and/or measuring the coupled power $P_C$ at the coupled port (P3) 218 without significantly reducing the output power $P_O$ of the signal 222 at the output port (P2) 216.

The input power $P_I$ and the coupled power $P_C$ determine a coupling factor $C_{3,1}$ between the input port (P1) 214 and the coupled port (P3) 218. The input power $P_I$ and the output power $P_O$ determine an insertion loss $L_{2,1}$ between the output port (P2) 216 and the input port (P1) 214. The coupling factor $C_{3,1}$ and the insertion loss $L_{2,1}$ are shown below in equations (Eq. 1) and (Eq. 2), respectively. Both the coupling factor $C_{3,1}$ and the insertion loss $L_{2,1}$ are measured in decibels (dB).

$$C_{3,1}=10\ \log(P_C/P_I) \quad (Eq.\ 1)$$

$$L_{2,1}=10\ \log(P_O/P_I) \quad (Eq.\ 2)$$

The coupling factor $C_{3,1}$ and the insertion loss $L_{2,1}$ are two important figures of merit of the directional coupler 200. A higher coupling factor $C_{3,1}$ means a higher coupling loss between the input port (P1) 214 and the coupled port (P3) 214. A lower insertion loss $L_{2,1}$ means higher power transfer from the input port (P1) 218 to the output port (P2) 216. The directional coupler 200 is required to provide as much isolation as possible between the isolated port (P4) 220 and the input port (P1) 214. In a non-limiting example, when the directional coupler 200 is provided in a radio frequency (RF) system, the isolation port (P4) 220 is commonly coupled to a fifty ohms (50Ω) resistor that absorbs reflected signal from the output port (P2) 216 to the isolated port (P4) 220. Accordingly, an isolated power $P_{ISO}$ measured at the isolated port (P4) 220 should be as low as possible.

Figure 2B:
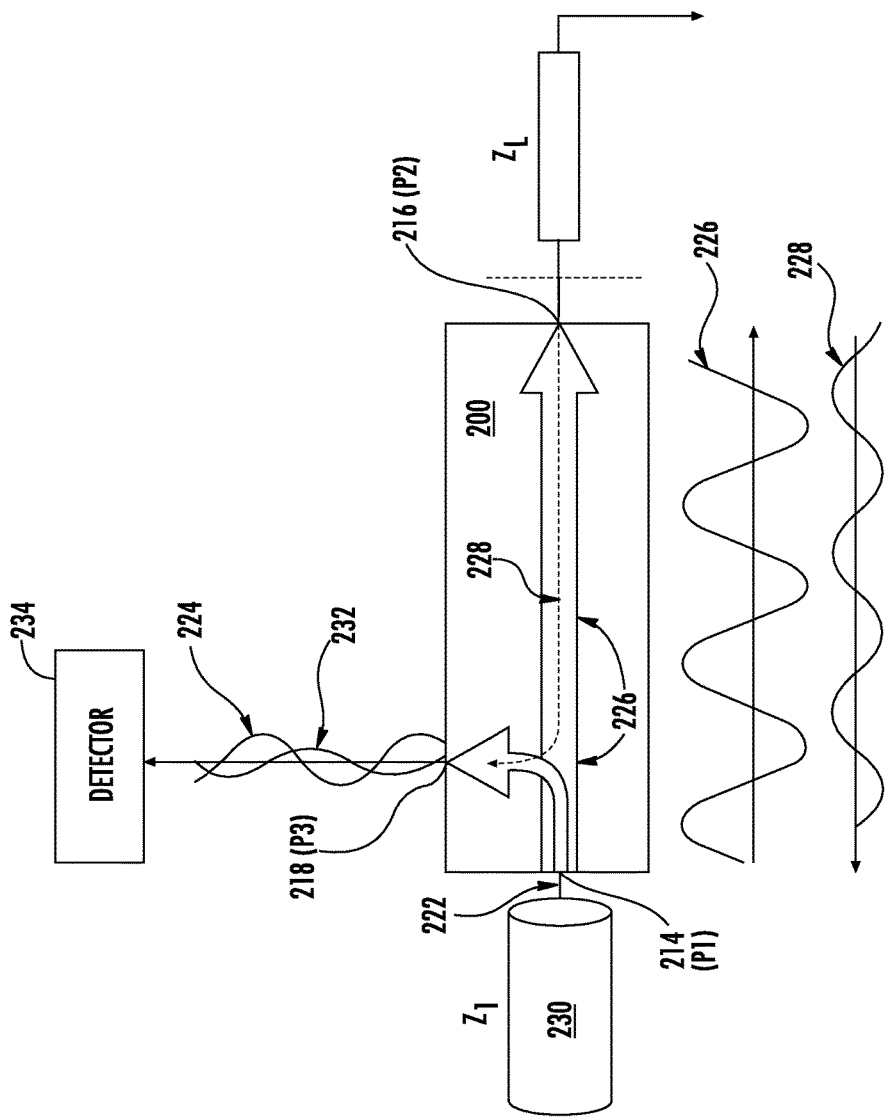
FIG. 2B is a schematic diagram providing an exemplary illustration of how a forward signal and a reflected signal can impact directivity of the directional coupler of FIG. 2A.

Another important figure of merit for the directional coupler 200 is directivity D. To help understand how directivity D is defined and determined, FIG. 2B is discussed next. In this regard, FIG. 2B is a schematic diagram providing an exemplary illustration of how a forward signal 226 and a reflected signal 228 can impact the directivity D of the directional coupler 200 of FIG. 2A. Common elements between FIGS. 2A and 2B are shown therein with common element numbers and will not be re-described herein.

With reference to FIG. 2B, the input port (P1) 214 of the directional coupler 200 is coupled to a transmission line 230 having impedance $Z_1$, while the output port (P2) 216 of the directional coupler 200 is coupled to load impedance $Z_L$. When the impedance $Z_1$ matches the load impedance $Z_L$, the forward signal 226 will travel from the input port (P1) 214 to the output port (P2) 216 without being reflected. As a result, the reflected signal 228 would be minimal. However, when the impedance $Z_1$ does not match perfectly with the load impedance $Z_L$, a portion of the forward signal 226 would be reflected as the reflected signal 228. As a result, a portion of the reflected signal 228 may be leaked to the coupled port (P3) 218 as a leaked signal 232. Consequently, when a detector 234 is coupled to the coupled port (P3) 218 to observe and measure the coupled signal 224, the detector 234 would instead receive a combination of the coupled signal 224 and the leaked signal 232, thus causing an inaccurate reading of the coupled signal 224. In this regard, the directivity D of the directional coupler 200 determines how well the directional coupler 200 discriminates between the forward signal 226 and the reflected signal 228. The directivity D may be determined based on the equation (Eq. 3) below.

$$D = C_{3,1} + I_{3,2} \qquad (\text{Eq. 3})$$

In the equation (Eq. 3) above, $C_{3,1}$ represents the coupling factor between the input port (P1) 214 and the coupled port (P3) 218 as determined based on Eq. 1, and $I_{3,2}$ represents isolation between the coupled port (P3) 218 and the output port (P2) 216. The isolation $I_{3,2}$ indicates the ability of the directional coupler 200 to reject and/or cancel out the reflected signal 228. The isolation $I_{3,2}$ can be determined based on the output power $P_O$ and the coupled power $P_C$ as shown in the equation (Eq. 4) below. The isolation $I_{3,2}$ is also measured in dB.

$$I_{3,2} = -10 \log(P_C/P_O) \qquad (\text{Eq. 4})$$

Thus, by substituting the coupling factor $C_{3,1}$ and the isolation $I_{3,2}$ of Eq. 3 with Eq. 1 and Eq. 4, respectively, Eq. 3 can be rewritten as the equation (Eq. 5) below. The directivity D is also measured in dB.

$$D = 10 \log(P_C/P_I) - 10 \log(P_C/P_O) \qquad (\text{Eq. 5})$$

In this regard, the higher the directivity D, the less leaked signal 232 at the coupled port (P3) 218, and thus a more accurate reading of the coupled signal 224 can be obtained at the coupled port (P3) 218.

With reference back to FIG. 2A, when the signal 222 flows from the input port (P1) 214 toward the output port (P2) 216 in the first microstrip 202, the electrical coupling between the first microstrip 202 and the second microstrip 204 causes the coupled signal 224 to be outputted from the coupled port (P3) 218. The signal 222 inherently causes an even mode current 236 to flow from the coupled port (P3) 218 toward the isolated port (P4) 220 in the second microstrip 204. In this regard, the even mode current 236 is the result of an even mode excitation of the signal 222 in the first microstrip 202. The even mode current 236 is associated with even mode characteristic impedance $Z_{0e}$, which can be expressed by the equation (Eq. 6) below.

$$Z_{0e} = Z_0 \sqrt{(1+C)/(1-C)} \qquad (\text{Eq. 6})$$

In the equation (Eq. 6) above, C (C≤1) represents a voltage-coupling factor of the directional coupler 200, while $Z_0$ represents single-line characteristic impedance of the first microstrip 202 or the second microstrip 204.

The signal 222 causes an electrical field 238 to be generated between the output port (P2) 216 and the isolated port (P4) 220. As such, the signal 222 also inherently causes an odd mode current 240 to flow from the isolated port (P4) 220 toward the coupled port (P3) 218 in the second microstrip 204. In this regard, the odd mode current 240 is the result of an odd mode excitation of the signal 222.

Hence, to be able to accurately observe the coupled signal 224 at the coupled port (P3) 218, it is necessary for the even mode current 236 to destructively cancel out the odd mode current 240. The odd mode current 240 is associated with odd mode characteristic impedance $Z_{0o}$, which can be expressed by the equation (Eq. 7) below.

$$Z_{0o} = Z_0 \sqrt{(1-C)/(1+C)} \qquad (\text{Eq. 7})$$

In the equation (Eq. 7) above, C (C≤1) represents the voltage-coupling factor of the directional coupler 200. $Z_0$ represents single-line characteristic impedance of the first microstrip 202 or the second microstrip 204.

The even mode current 236 and the odd mode current 240 are important characteristics inherent to a pair of coupled lines, such as the first microstrip 202 and the second microstrip 204 in the directional coupler 200. As such, FIGS. 2C and 2D are discussed next to help understand how the even mode current 236 and the odd mode current 240 can potentially impact the accuracy in measuring the coupled signal 224 at the coupled port (P3) 218.

Figure 2C:
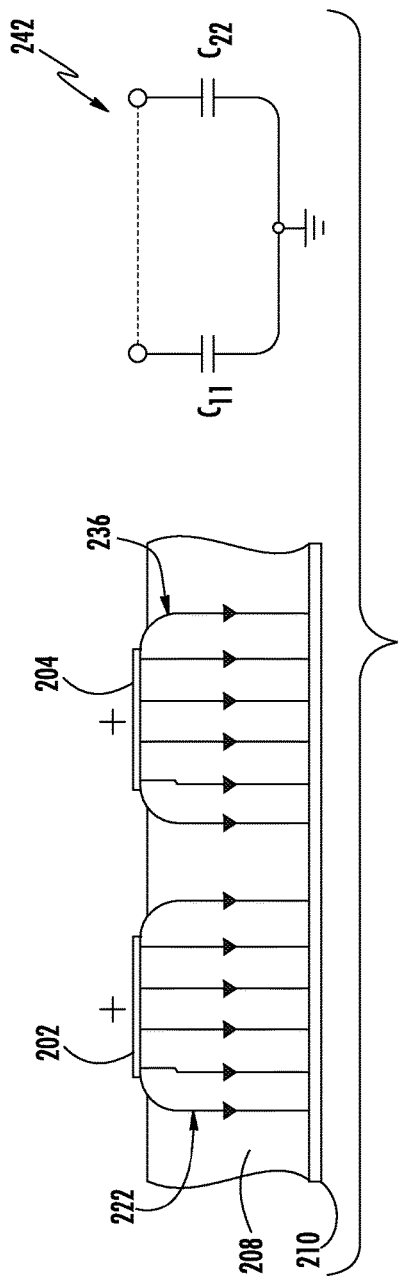
FIG. 2C is a schematic diagram providing an exemplary illustration of even mode currents that are inherent to the directional coupler of FIG. 2A.
Figure 2D:
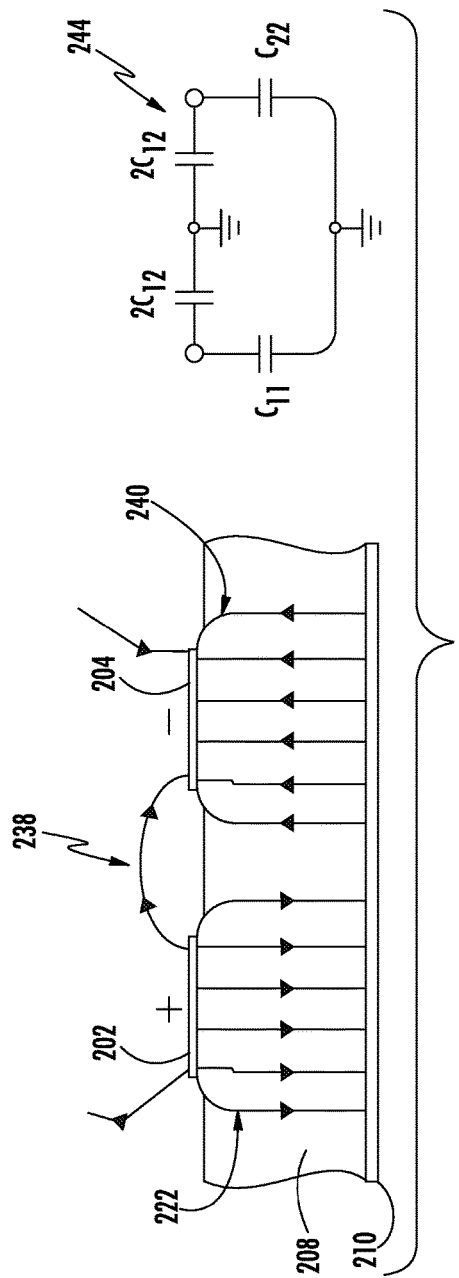
FIG. 2D is a schematic diagram providing an exemplary illustration of odd mode currents that are inherent to the directional coupler of FIG. 2A.

In this regard, FIG. 2C is a schematic diagram providing an exemplary illustration of even mode currents that are inherent to the directional coupler 200 of FIG. 2A. Common elements between FIGS. 2A and 2C are shown therein with common element numbers and will not be re-described herein.

As previously discussed in FIG. 2A, the signal 222 and the even mode current 236 flow in the same direction in the first microstrip 202 and the second microstrip 204, respectively. In this regard, the signal 222 and the even mode current 236 form the even mode currents in the directional coupler 200. The signal 222 flows along the first microstrip 202 toward the output port (P2) 216 and then propagates through the substrate 208 to be sunk by the ground plane 210. The even mode current 236 flows toward the isolated port (P4) 220 along the second microstrip 204 and then propagates through the substrate 208 to be sunk by the ground plane 210.

A capacitance $C_e$ associated with the even mode currents can be equated with the capacitance of an even mode capacitance circuit 242. The even mode capacitance circuit 242 includes a first capacitor C11 and a second capacitor C22. The first capacitor C11 represents a first capacitance between the first microstrip 202 and the ground plane 210. The second capacitor C22 represents a second capacitance between the second microstrip 204 and the ground plane 210. As such, the capacitance $C_e$ associated with the even mode currents can be determined based on the equation (Eq. 8) below.

$$C_e = C11 = C22 \qquad (\text{Eq. 8})$$

FIG. 2D is a schematic diagram providing an exemplary illustration of odd mode currents that are inherent to the directional coupler 200 of FIG. 2A. Common elements between FIGS. 2A and 2D are shown therein with common element numbers and will not be re-described herein.

As previously discussed in FIG. 2A, the signal 222 and the odd mode current 240 flow in opposite directions in the first microstrip 202 and the second microstrip 204, respectively. In this regard, the signal 222 and the odd mode current 240 form the odd mode currents in the directional coupler 200. The signal 222 flows along the first microstrip 202 toward the output port (P2) 216 and then propagates through the substrate 208 to be sunk by the ground plane 210. The odd mode current 240, in contrast, is generated by the electrical field 238 and flows from the isolated port (P4) 220 toward the coupled port (P3) 218 along the second microstrip 204.

A capacitance $C_o$ associated with the odd mode currents can be equated with the capacitance of an odd mode capacitance circuit 244. The odd mode capacitance circuit 244 includes the first capacitor C11, the second capacitor C22, and a pair of third capacitors C12. The first capacitor C11 represents the first capacitance between the first microstrip 202 and the ground plane 210. The second capacitor C22 represents the second capacitance between the second microstrip 204 and the ground plane 210. Each of the third capacitors C12 represents a third capacitance between the first microstrip 202 and the second microstrip 204. As such, the capacitance $C_o$ associated with the odd mode currents can be determined based on the equation (Eq. 9) below.

$$C_o = C11 + 2C12 = C22 + 2C12 \quad (Eq. 9)$$

Based on Eq. 8 and Eq. 9 above, it can be noted that the odd mode capacitance $C_o$ is higher than the even mode capacitance $C_e$. Accordingly, it can be said that relative permittivity of the transmission medium $\varepsilon_{r\_odd}$ for conveying the odd mode current 240 is lower than relative permittivity of the transmission medium $\varepsilon_{r\_even}$ for conveying the even mode current 236. As such, it is possible to determine even mode phase velocity $v_{even}$ of the even mode current 236 and odd mode phase velocity $v_{odd}$ of the odd mode current 240 based on equation (Eq. 10) and equation (Eq. 11), respectively.

$$v_{even} = \frac{V_{light}}{\sqrt{\varepsilon_{r\_even}\varepsilon_0\mu_r\mu_0}} \quad (Eq. 10)$$

$$v_{odd} = \frac{V_{light}}{\sqrt{\varepsilon_{r\_odd}\varepsilon_0\mu_r\mu_0}} \quad (Eq. 11)$$

In Eq. 10 and Eq. 11 above, $V_{light}$ represents the speed of light, which is approximately 187,000 miles per second, $\varepsilon_0$ represents vacuum permittivity, and $\mu_r\mu_0$ would equal one when the first microstrip 202 and the second microstrip 204 are provided as non-magnetic copper traces. Notably, since the relative permittivity of the transmission medium $\varepsilon_{r\_odd}$ is lower than the relative permittivity of the transmission medium $\varepsilon_{r\_even}$, the odd mode phase velocity $v_{odd}$ of the odd mode current 240 would be higher than the even mode phase velocity $v_{even}$ of the even mode current 236.

The difference between the odd mode phase velocity $v_{odd}$ and the even mode phase velocity $v_{even}$ may be attributed to the fact that both the first microstrip 202 and the second microstrip 204 are only quasi-transverse electromagnetic (TEM), not fully TEM like coax or stripline mediums. According to discussions in FIGS. 2C-2D above, the even mode current 236 flows along the second microstrip 204 toward the isolated port (P4) 220, propagates through the substrate 208, and subsequently returns to the coupled port (P3) 218 though the ground plane 210. In contrast, the odd mode current 240 is induced by the electrical field 238 and flows toward the coupled port (P3) 218 via the second microstrip 204. Notably, the even mode current 236 propagates through the substrate 208 that has a higher permittivity $\varepsilon_{sub}$ (e.g., ≈3.66 as in Rogers 4350B commercial substrate laminates). In contrast, the odd mode current 240 propagates through the electrical field 238 that as a lower permittivity $\varepsilon_{air}$ (≈2.8). Understandably, a portion of the odd mode current 240 may still propagate through the substrate 208 and return to the coupled port (P3) 218 through the ground plane 210. However, it is possible to significantly reduce the portion of the odd mode current 240 propagating through the substrate 208 by increasing thickness of the substrate 208 to twenty millimeters (20 mm), for example. As a result, the odd mode current 240 may flow toward the coupled port (P3) 218 primarily through the electrical field 238 and the second microstrip 204. In this regard, because the odd mode phase velocity $v_{odd}$ of the odd mode current 240 is higher than the even mode phase velocity $v_{even}$ of the even mode current 236, the odd mode current 240 and the even mode current 236 may not be destructively cancelled. As a result, the directivity D of the directional coupler 200 may lower than what is needed to ensure an accurate measurement of the coupled signal 224 at the coupled port (P3) 218.

With reference back to FIG. 2A, the first microstrip 202 and the second microstrip 204 in the directional coupler 200 each have a length 246 and a width 248. The length 246 may be approximately one quarter (¼) of a center frequency wavelength λ of the directional coupler 200 and the width 248 may be so determined to provide 50Ω impedance.

In a non-limiting example, the bandwidth of the directional coupler 200 may be three times the bandwidth of the signal 222 due to intermodulation products that may be associated with the signal 222. As such, another important figure of merit of the directional coupler 200 relates to coupling ripples across the entire bandwidth of the directional coupler 200. In this regard, FIG. 2E is a graph 250 providing an exemplary illustration of various coupling ripples in the directional coupler 200 of FIG. 2A.

Figure 2E:
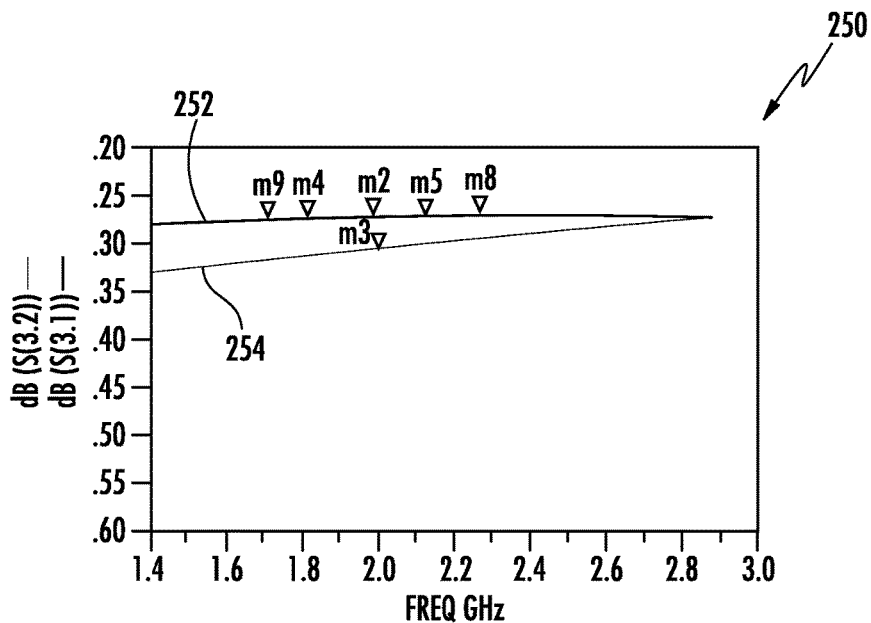
FIG. 2E is a graph providing an exemplary illustration of various coupling ripples in the directional coupler of FIG. 2A.

With reference to FIG. 2E, in a non-limiting example, the directional coupler 200 of FIG. 2A receives the signal 222 at a center frequency of 1960 MHz. The directional coupler 200 is configured to have a total bandwidth of 300 MHz (1810-2110 MHz). The graph 250 thus illustrates the coupling ripple associated with the directional coupler 200 across the total bandwidth of 300 MHz. The graph 250 includes a first curve 252 that illustrates coupling ripples between the coupled port (P3) 218 and the input port (P1) 214 of FIG. 2A. The graph 250 includes a second curve 254 that illustrates coupling ripples between the coupled port (P3) 218 and the output port (P2) 216 of FIG. 2A. According to the first curve 252, the coupling ripples between the coupled port (P3) 218 and the input port (P1) 214 are below 0.2 dB. According to the second curve 254, the coupling ripples between the coupled port (P3) 218 and the output port (P2) 216 are also below 0.2 dB. As such, the coupling ripples of the directional coupler 200 are relatively low.

Figure 2F:
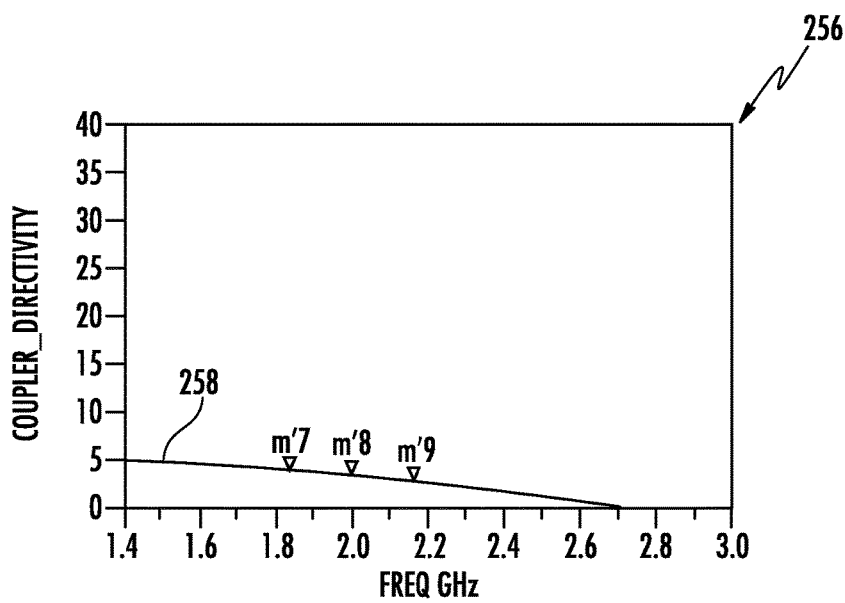
FIG. 2F is a graph providing an exemplary illustration of directivity of the directional coupler of FIG. 2A.

According to previous discussions in FIGS. 2A-2D, directivity D is another important figure of merit of the directional coupler 200. In this regard, FIG. 2F is a graph 256 providing an exemplary illustration of the directivity D of the directional coupler 200 of FIG. 2A. Like the graph 250 of FIG. 2E, the graph 256 is also plotted across the 300 MHz bandwidth of the directional coupler 200. The graph 256 includes a directivity curve 258, which illustrates that the directivity D is below 3 dB. Notably, the 3 dB directivity D of the directional coupler 200 is relatively low. As a result, according to previous discussions in FIGS. 2C-2D, the odd mode current 240 and the even mode current 236 would not cancel out each other. Consequently, the coupled signal 224 may become more sensitive to impedance mismatch (reflection) at the output port (P2) 216, and an inaccurate measurement of the coupled signal 224 at the coupled port (P3) 218 may result. There may be techniques to improve the directivity D from 3 dB to 7 dB, for example. However, a simulation performed with the same 300 MHz bandwidth of the directional coupler 200 indicates that the coupling ripple of the directional coupler 200 could increase from the previous 0.2 dB to approximately 0.9 dB. In this regard, those existing techniques achieve improvement in the directivity D at the expense of the coupling ripple. Hence, it may be desired to improve the directivity D of the directional coupler 200 without compromising other performance measures, such as the coupling ripple.

Figure 3A:
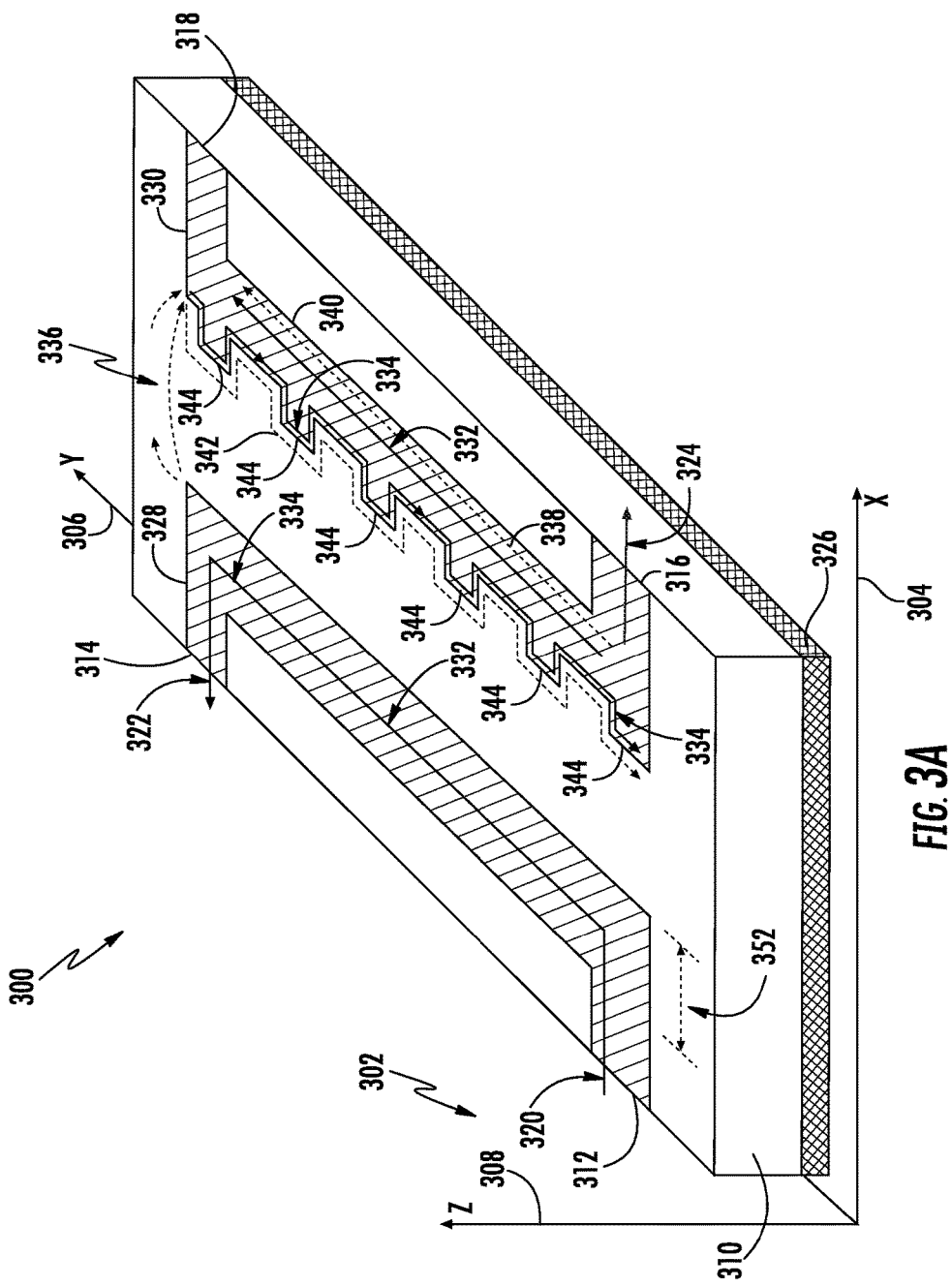
FIG. 3A is a schematic diagram of an exemplary high-directivity directional coupler that can provide improved directivity without compromising other performance measures (e.g., coupling ripple) in the high-directivity directional coupler.

In this regard, FIG. 3A is a schematic diagram of an exemplary high-directivity directional coupler 300 that can provide improved directivity D without compromising other performance measures (e.g., coupling ripple) in the high-directivity directional coupler 300. In the exemplary aspects discussed hereinafter, the high-directivity directional coupler 300 refers to a directional coupler capable of providing a directivity D in excess of 15 dB. The high-directivity directional coupler 300 is illustrated herein in a three-dimensional (3D) coordinate system 302 consisting of an x-axis 304, a y-axis 306, and a z-axis 308. Notably, orientation-related phrases, such as "above" and "underneath" are used hereinafter in relation to the z-axis 308.

With reference to FIG. 3A, the high-directivity directional coupler 300 includes a substrate 310, which may be a printed circuit board (PCB) for example. The high-directivity directional coupler 300 includes an input port 312, an output port 314, a coupled port 316, and an isolated port 318. The input port 312 is configured to receive an input signal 320. The output port 314 is configured to output the input signal 320 as an output signal 322. The coupled port 316 is configured to output a coupled signal 324 that is proportional to the input signal 320. The isolated port 318 is configured to provide isolation to the input signal 320 and the coupled signal 324. The high-directivity directional coupler 300 includes a ground plane 326 that is disposed underneath the substrate 310. The high-directivity directional coupler 300 includes a first microstrip 328 disposed above the substrate 310 and a second microstrip 330 disposed above the substrate 310 parallel to the first microstrip 328. The first microstrip 328 is configured to convey the input signal 320 from the input port 312 to the output port 314.

According to previous discussions in FIGS. 2A and 2C-2D, when the high-directivity directional coupler 300 receives the input signal 320 and outputs the output signal 322, the input signal 320 inherently causes an even mode current 332 and an odd mode current 334 in the second microstrip 330 as a result of the even mode excitation and the odd mode excitation, respectively. The even mode current 332 in the second microstrip 330, which flows in the same direction as the input signal 320 in the first microstrip 328, travels from the coupled port 316 toward the isolated port 318 and then propagates through the substrate 310 to be sunk by the ground plane 326. The odd mode current 334 travels in the opposite direction from the input signal 320 in the first microstrip 328 and the even mode current 332 in the second microstrip 330.

As previously discussed, the odd mode current 334 has an odd mode phase velocity $v_{odd}$ that is higher than an even mode phase velocity $v_{even}$ of the even mode current 332. As such, for the high-directivity directional coupler 300 to render the directivity D in excess of 15 dB, it would be necessary to slow down the odd mode current 334 to match the odd mode phase velocity $v_{odd}$ with the even mode phase velocity $v_{even}$. As is further discussed below, in the high-directivity directional coupler 300, the odd mode current 334 takes a longer return path to return to the coupled port 316. The longer return path causes the odd mode current 334 to slow down. As a result, the odd mode phase velocity $v_{odd}$ would match the even mode phase velocity $v_{even}$ and the odd mode current 334 would be cancelled out by the even mode current 332. Hence, the high-directivity directional coupler 300 can render high-directivity without comprising other performance aspects (e.g., coupling ripple) of the high-directivity directional coupler 300.

The second microstrip 330 provides a linear forward path 338 for conveying the even mode current 332 from the coupled port 316 to the ground plane 326. In this regard, the even mode current 332 flows at the even mode phase velocity $v_{even}$ along the second microstrip 330, propagates through the substrate 310, and returns to the coupled port 316 via the ground plane 326. Given that the even mode current 332 returns to the coupled port 316 primarily via the ground plane 326, the even mode current 332 would travel along a shortest path with a lowest inductance. As such, the linear forward path 338 would be closer to an outer edge 340 of the second microstrip 330 and away from the first microstrip 328.

Figure 3B:
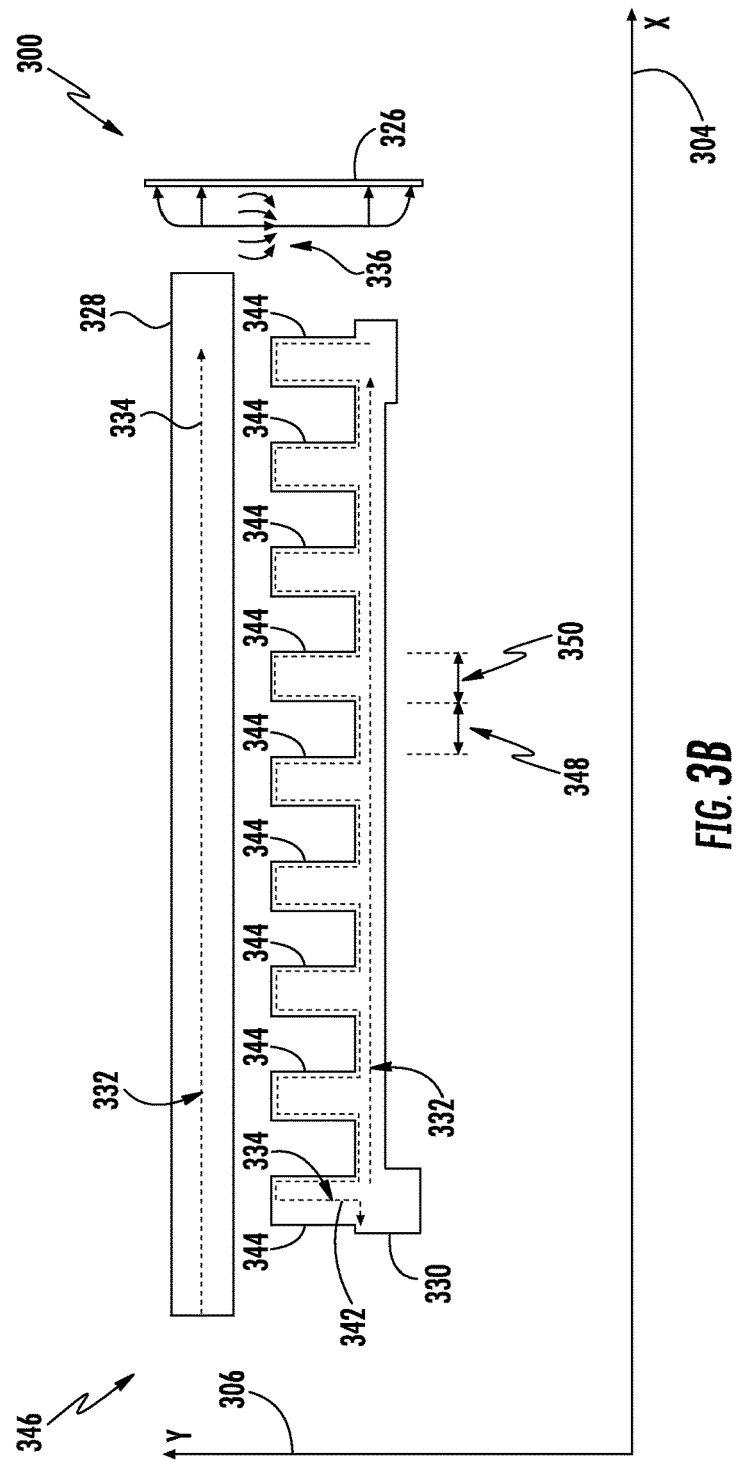
FIG. 3B is a schematic diagram providing an exemplary top view of the high-directivity directional coupler of FIG. 3A.

The second microstrip 330 also provides a non-linear return path 342 for conveying the odd mode current 334 in an opposite direction from the even mode current 332. The non-linear return path 342 is longer than the linear forward path 338 to slow down the odd mode current 334 to cause destructive cancellation between the even mode current 332 and the odd mode current 334. In this regard, the non-linear return path 342 can compensate for an inequality between the odd mode phase velocity $v_{odd}$ and the even mode phase velocity $v_{even}$. To provide the non-linear return path 342, the second microstrip 330 includes a plurality of rectangular-shaped stubs 344 disposed adjacent to the first microstrip 328. The rectangular-shaped stubs 344 and the non-linear return path 342 formed by the rectangular-shaped stubs 344 are further discussed below with reference to FIG. 3B. In this regard, FIG. 3B is a schematic diagram providing an exemplary top view 346 of the high-directivity directional coupler 300 of FIG. 3A. Common elements between FIGS. 3A and 3B are shown therein with common element numbers and will not be re-described herein.

With reference to FIG. 3B, each of the rectangular-shaped stubs 344 is separated from an adjacent rectangular-shaped stub among the rectangular-shaped stubs 344 by a separation distance 348. Each of the rectangular-shaped stubs 344 has a respective width 350. In this regard, in a non-limiting example, the rectangular-shaped stubs 344 can have an equal width 350 and are separated by an equal separation distance 348. In another non-limiting example, the respective width 350 is less than or equal to sixty percent (60%) of the separation distance 348 to help reduce potential parasitic capacitance between the rectangular-shaped stubs 344.

Given that the odd mode current 334 flows in the second microstrip 330 in opposite direction from the even mode current 332 flowing in the first microstrip 328, the odd mode current 334 in the second microstrip 330 would take a path with the least inductance to return to the coupled port 316. As such, as shown in FIG. 3B, the non-linear return path 342 is formed along outer edges of the rectangular-shaped stubs 344 and adjacent to the first microstrip 328.

In one non-limiting example, a total length of the non-linear return path 342 can be determined based on a ratio between the odd mode phase velocity $v_{odd}$ and the even mode phase velocity $v_{even}$. In another non-limiting, the total length of the non-linear return path 342 can be determined by connecting test equipment at the coupled port 316. Accordingly, the total length of the non-linear return path 342 can be adjusted continuously until a desirable reading of the coupled signal 324 is obtained at the coupled port 316.

The high-directivity directional coupler 300 of FIG. 3A can be fabricated based on a process. In this regard, FIG. 4 is a flowchart of an exemplary process 400 for fabricating the high-directivity directional coupler 300 of FIG. 3A.

Figure 4:
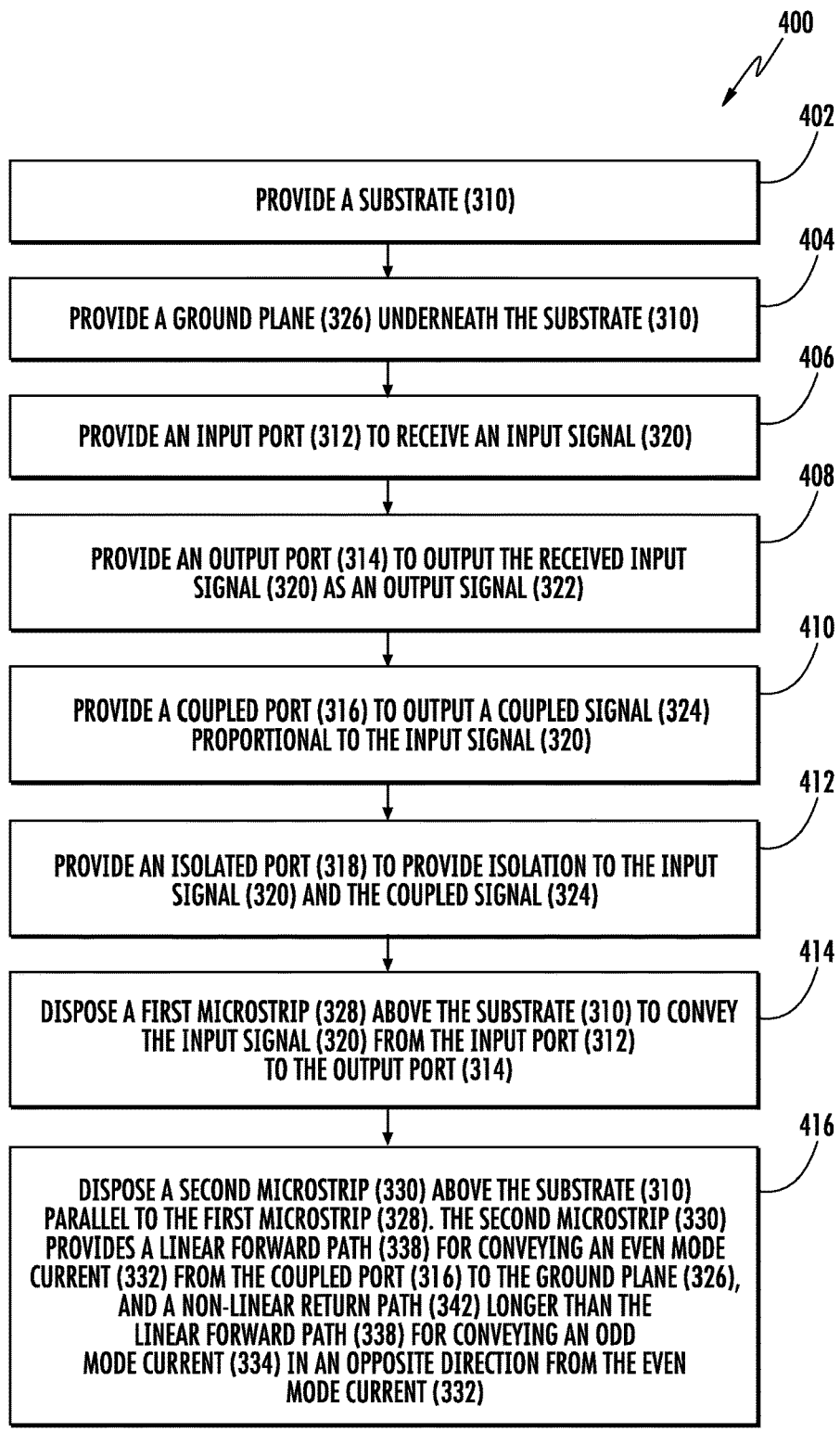
FIG. 4 is a flowchart of an exemplary process for fabricating the high-directivity directional coupler of FIG. 3A.

With reference to FIG. 4, the substrate 310 is first provided (block 402). The ground plane 326 is then provided underneath the substrate 310 (block 404). The input port 312 is provided to receive the input signal 320 (block 406). The output port 314 is provided to output the received input signal 320 as the output signal 322 (block 408). The coupled port 316 is provided to output the coupled signal 324 proportional to the input signal 320 (block 410). The isolated port 318 is provided to provide isolation to the input signal 320 and the coupled signal 324 (block 412). The first microstrip 328 is disposed above the substrate 310 to convey the input signal 320 from the input port 312 to the output port 314 (block 414). The second microstrip 330 is disposed above the substrate 310 parallel to the first microstrip 328 (block 416). The second microstrip 330 provides the linear forward path 338 for conveying the even mode current 332 from the coupled port 316 to the ground plane 326. The second microstrip 330 also provides the non-linear return path 342 longer than the linear forward path 338 for conveying the odd mode current 334 in an opposite direction from the even mode current 332.

With reference back to FIG. 3A, the high-directivity directional coupler 300 provides significantly higher directivity than the directional coupler 200 of FIG. 2A while maintaining a similar level of coupling ripples as the directional coupler 200 of FIG. 2A. In this regard, FIG. 5A is a graph 500 providing an exemplary illustration of various coupling ripples in the high-directivity directional coupler 300 of FIG. 3A.

Figure 5A:
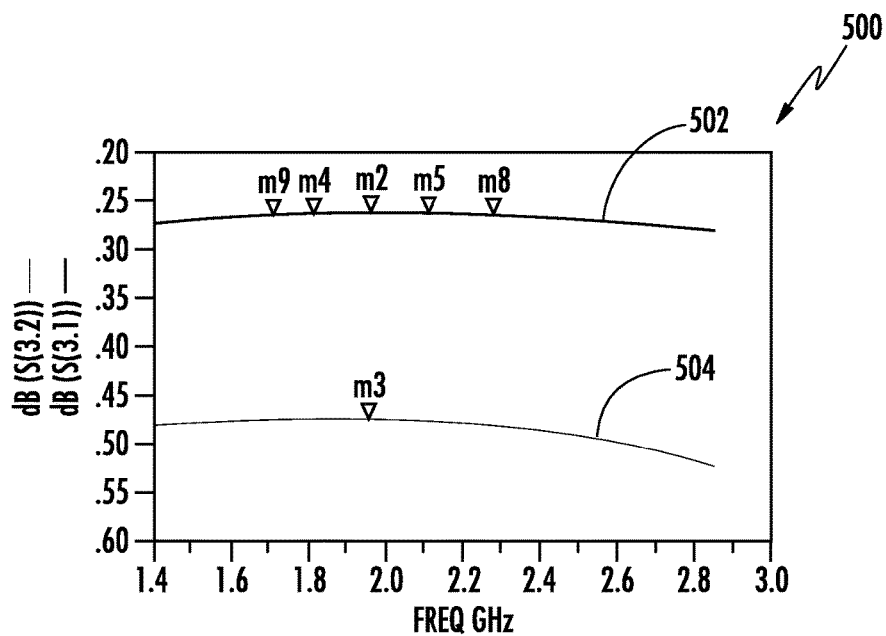
FIG. 5A is a graph providing an exemplary illustration of various coupling ripples in the high-directivity directional coupler of FIG. 3A.

With reference to FIG. 5A, in a non-limiting example, the high-directivity directional coupler 300 of FIG. 3A receives the input signal 320 at a center frequency of 1960 MHz. The high-directivity directional coupler 300 is configured to have a total bandwidth of 300 MHz (1810-2110 MHz). The graph 500 thus illustrates the coupling ripple associated with the high-directivity directional coupler 300 across the total bandwidth of 300 MHz. The graph 500 includes a first curve 502 that illustrates coupling ripples between the coupled port 316 and the input port 312 of FIG. 3A. The graph 500 includes a second curve 504 that illustrates coupling ripples between the coupled port 316 and the output port 314 of FIG. 3A. According to the first curve 502, the coupling ripples between the coupled port 316 and the input port 312 are below 0.2 dB. According to the second curve 504, the coupling ripples between the coupled port 316 and the output port 314 are also below 0.2 dB. As such, the coupling ripples in the high-directivity directional coupler 300 are similar to the coupling ripples of the directional coupler 200 as shown in FIG. 2E.

Figure 5B:
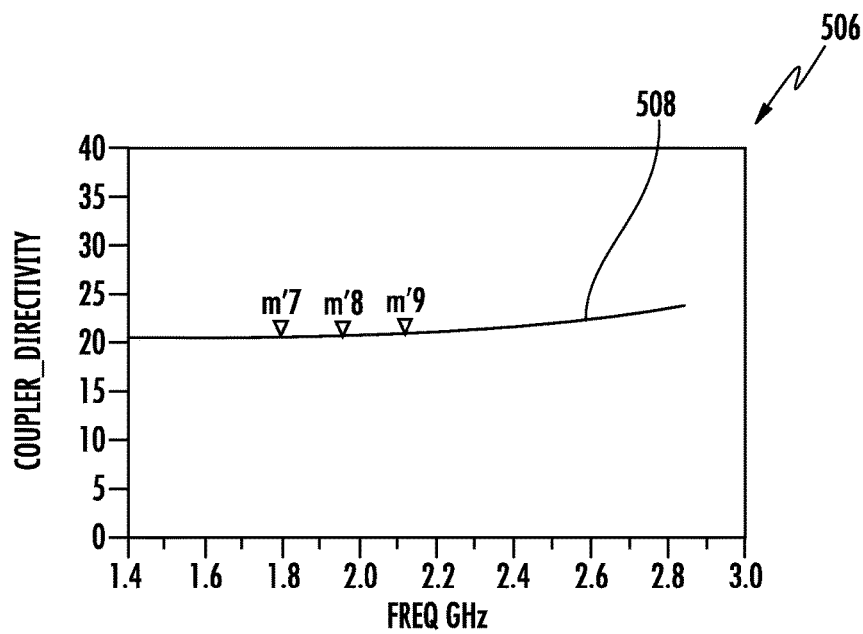
FIG. 5B is a graph providing an exemplary illustration of higher directivity in the high-directivity directional coupler of FIG. 3A compared to the directional coupler of FIG. 2A.

FIG. 5B is a graph 506 providing an exemplary illustration of higher directivity in the high-directivity directional coupler 300 of FIG. 3A compared to the directional coupler 200 of FIG. 2A. Like the graph 500 of FIG. 3A, the graph 506 is also plotted across the 300 MHz bandwidth of the high-directivity directional coupler 300. The graph 506 includes a directivity curve 508, which illustrates that the directivity of the high-directivity directional coupler 300 is above 20 dB. Hence, the high-directivity directional coupler 300 can provide significantly higher directivity than the directional coupler 200 of FIG. 2A without increasing coupling ripple, insertion loss, return loss, power handling, and price.

With reference back to FIG. 3A, in addition to providing higher directivity than the directional coupler 200 of FIG. 2A and maintaining similar coupling ripples as the directional coupler 200, the high-directivity directional coupler 300 is also more advantageous than the commercial low temperature co-fired ceramic (LTCC) (chip component) based directional coupler 200 in a variety of areas. In one aspect, the high-directivity directional coupler 300 can be simply printed on a distributed PCB as opposed to a high cost multilayer PCB. In another aspect, the high-directivity directional coupler 300 can support a wider operational bandwidth, making it suitable for wideband RF applications with up to 500 MHz operational bandwidth. As is further discussed next in FIG. 6, the high-directivity directional coupler 300 can also be used in applications employing digital pre-distortion (DPD) across wide bandwidth. In another aspect, the high-directivity directional coupler 300 only requires a 50Ω resistor on the isolated port 318. This is because the high-directivity directional coupler 300 does not need to withstand relatively higher power levels injected to the input port 312 and coupled to the isolated port 318 given the ability of the high-directivity directional coupler 300 in cancelling out the even mode current 332 and the odd mode current 334. In another aspect, the high-directivity directional coupler 300 has very low insertion loss. This is due to the fact that insertion loss is a function of the first microstrip 328 between the input port 312 and the output port 314. In a non-limiting example, the first microstrip 328 has a respective width 352 that renders the first microstrip with 50Ω resistance. As such, the insertion loss of the high-directivity directional coupler 300 is minimal. In another aspect, the high-directivity directional coupler 300 has very high return loss. This is due to the fact that return loss is a function of the first microstrip 328 between the input port 312 and the output port 314. As such, the 50Ω resistance of the first microstrip 328 can maximize the return loss. On the other hand, return loss at the coupled port 316 is a function of the 50Ω resistor coupled to the isolated port 318. As such, the return loss at the coupled port 316 is high as well. In another aspect, both the first microstrip 328 and the second microstrip 330 can withstand very high power, thus making the high-directivity directional coupler 300 suitable for carrying higher power (e.g., class 3) RF signals. In another aspect, the high-directivity directional coupler 300 can be manufactured with lower costs and a smaller footprint compared to the directional coupler 200 of FIG. 2A.

Figure 6:
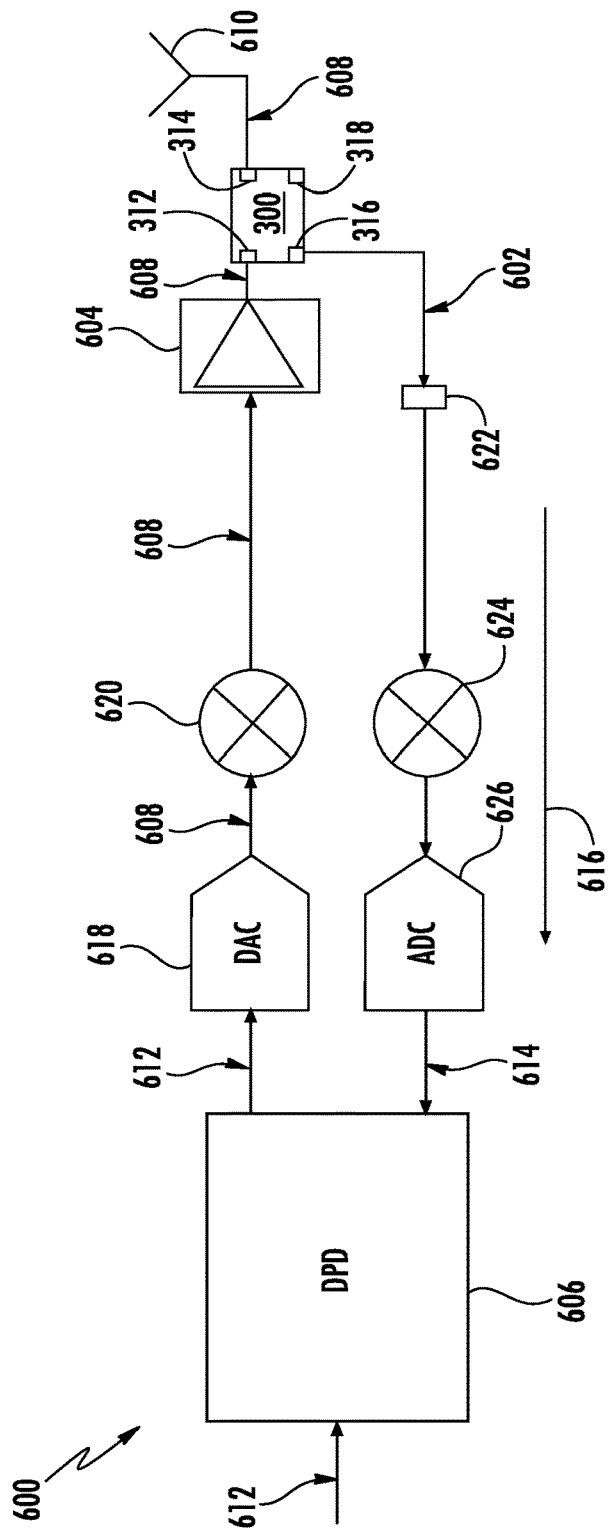
FIG. 6 is a schematic diagram of an exemplary radio frequency (RF) power management circuit in which the high-directivity directional coupler of FIG. 3A is configured to provide an RF feedback signal from a power amplifier to a digital pre-distortion (DPD) circuit to help improve linearity of the power amplifier.

As mentioned earlier, the high-directivity directional coupler 300 can be used in applications employing DPD across wide bandwidth. In this regard, FIG. 6 is a schematic diagram of an exemplary RF power management circuit 600 in which the high-directivity directional coupler 300 of FIG. 3A is configured to provide an RF feedback signal 602 from a power amplifier 604 to a DPD circuit 606 to help improve linearity of the power amplifier 604. Common elements between FIGS. 3A and 6 are shown therein with common element numbers and will not be re-described herein.

With reference to FIG. 6, the power amplifier 604 is configured to receive and amplify an RF signal 608 and provide the amplified RF signal 608 to the input port 312 of the high-directivity directional coupler 300. The high-directivity directional coupler 300 is coupled to an antenna 610 via the output port 314. The high-directivity directional coupler 300 is configured to output the amplified RF signal 608 to the antenna 610 for transmission to client devices.

The DPD circuit 606 is configured to receive a digital signal 612 and provide linearity correction to the digital signal 612 based on a digital feedback signal 614 received via a feedback path 616. The RF power management circuit 600 includes a digital-to-analog converter (DAC) 618 configured to convert the digital signal 612 into the RF signal 608. The RF power management circuit 600 includes a frequency up-converter 620 configured to convert the RF signal 608 from a baseband frequency to a carrier frequency and provide the RF signal 608 to the power amplifier 604.

The feedback path 616 is configured to receive the RF feedback signal 602 via the coupled port 316 of the high-directivity directional coupler 300. The feedback path 616 includes an attenuator 622 configured to reduce the power of the RF feedback signal 602. The feedback path 616 includes a frequency down-converter 624 configured to convert the RF feedback signal 602 from the carrier frequency to the baseband frequency. The feedback path 616 also includes an analog-to-digital converter (ADC) 626 to convert the RF feedback signal 602 to the digital feedback signal 614 and provide the digital feedback signal 614 to the DPD circuit 606.

According to earlier discussions in FIG. 3A, the high-directivity directional coupler 300 can provide higher directivity in combination with lower coupling ripple and insertion loss. As such, the high-directivity directional coupler 300 can provide accurate feedback about actual power level outputted by the power amplifier 604. Accordingly, the DPD circuit 606 can effectively pre-distort the digital signal 612 to improve linearity in the power amplifier 604.

Figure 7:
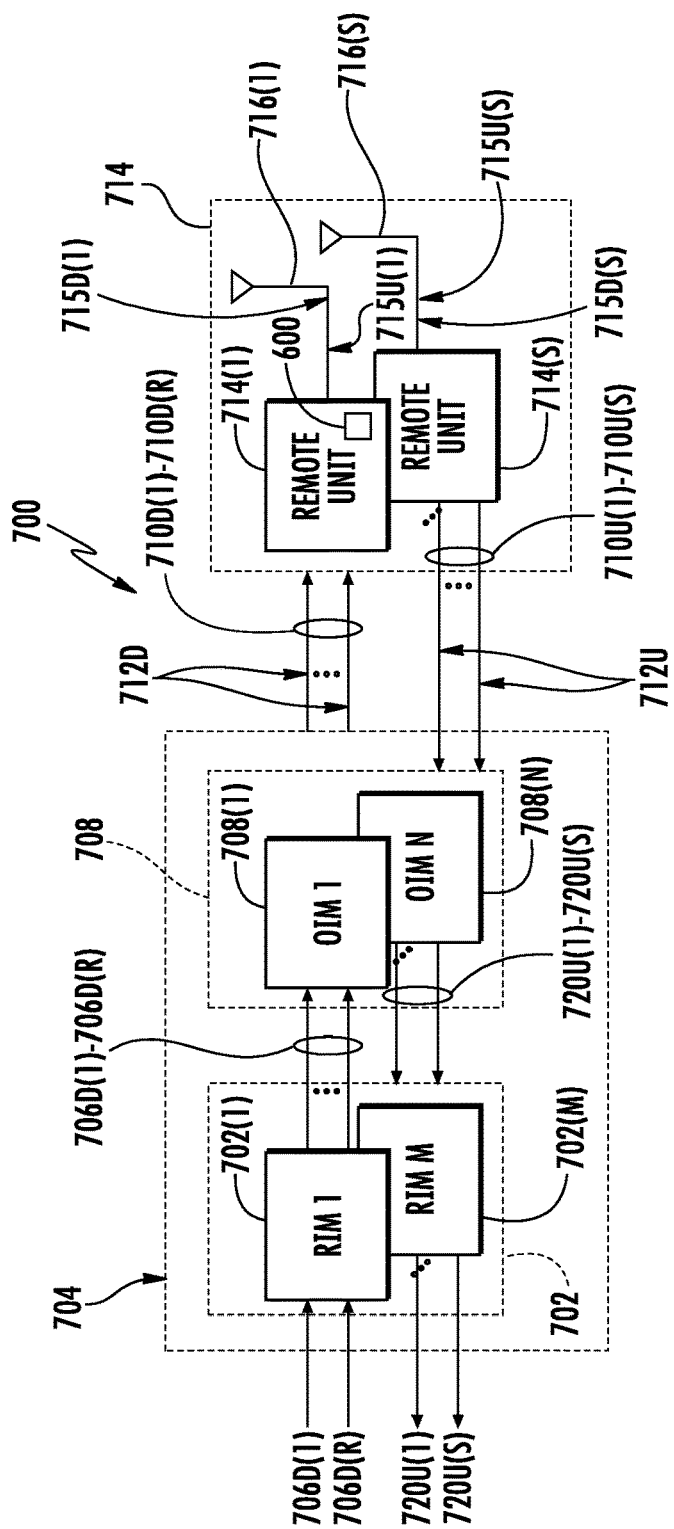
FIG. 7 is a schematic diagram an exemplary WDS provided in the form of an optical fiber-based WDS in which at least one selected remote unit among a plurality of remote units can employ the RF power management circuit of FIG. 6 for improving linearity of a power amplifier in the selected remote unit.

The RF power management circuit 600 can be provided in a remote unit(s) in a wireless distribution system (WDS) to help fine tune a power amplifier(s) in the remote unit. In this regard, FIG. 7 is a schematic diagram an exemplary WDS 700 provided in the form of an optical fiber-based WDS in which at least one selected remote unit among a plurality of remote units can employ the RF power management circuit 600 of FIG. 6 for improving linearity of a power amplifier in the selected remote unit.

The WDS 700 includes an optical fiber for distributing communications services for multiple frequency bands. The WDS 700 in this example is comprised of three (3) main components in this example. A plurality of radio interfaces provided in the form of radio interface modules (RIMs) 702(1)-702(M) are provided in a central unit 704 to receive and process a plurality of downlink digital communications signals 706D(1)-706D(R) prior to optical conversion into downlink optical fiber-based communications signals. The downlink digital communications signals 706D(1)-706D(R) may be received from a base station as an example. The RIMs 702(1)-702(M) provide both downlink and uplink interfaces for signal processing. The notations "1-R" and "1-M" indicate that any number of the referenced component, 1-R and 1-M, respectively, may be provided. The central unit 704 is configured to accept the RIMs 702(1)-702(M) as modular components that can easily be installed and removed or replaced in the central unit 704. In one example, the central unit 704 is configured to support up to twelve (12) RIMs 702(1)-702(12). Each RIM 702(1)-702(M) can be designed to support a particular type of radio source or range of radio sources (i.e., frequencies) to provide flexibility in configuring the central unit 704 and the WDS 700 to support the desired radio sources.

For example, one RIM 702 may be configured to support the Personalized Communications System (PCS) radio band. Another RIM 702 may be configured to support the 800 megahertz (MHz) radio band. In this example, by inclusion of the RIMs 702(1)-702(M), the central unit 704 could be configured to support and distribute communications signals on both PCS and Long-Term Evolution (LTE) 700 radio bands, as an example. The RIMs 702(1)-702(M) may be provided in the central unit 704 that support any frequency bands desired, including but not limited to the US Cellular band, PCS band, Advanced Wireless Service (AWS) band, 700 MHz band, Global System for Mobile communications (GSM) 900, GSM 1800, and Universal Mobile Telecommunications System (UMTS). The RIMs 702(1)-702(M) may also be provided in the central unit 704 that support any wireless technologies desired, including but not limited to Code Division Multiple Access (CDMA), CDMA200, 1xRTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 702(1)-702(M) may be provided in the central unit 704 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 7, the downlink digital communications signals 706D(1)-706D(R) are provided to a plurality of optical interfaces provided in the form of optical interface modules (OIMs) 708(1)-708(N) in this embodiment to convert the downlink digital communications signals 706D(1)-706D(R) into a plurality of downlink optical fiber-based communications signals 710D(1)-710D(R). The notation "1-N" indicates that any number of the referenced component 1-N may be provided. The OIMs 708(1)-708(N) may be configured to provide a plurality of optical interface components (OICs) that contain optical-to-electrical (O/E) and electrical-to-optical (E/O) converters, as will be described in more detail below. The OIMs 708(1)-708(N) support the radio bands that can be provided by the RIMs 702(1)-702(M), including the examples previously described above.

The OIMs 708(1)-708(N) each include E/O converters to convert the downlink digital communications signals 706D (1)-706D(R) into the downlink optical fiber-based communications signals 710D(1)-710D(R). The downlink optical fiber-based communications signals 710D(1)-710D(R) are communicated over a downlink optical fiber-based communications medium 712D to a plurality of remote units 714(1)-714(S). At least one selected remote unit among the remote units 714(1)-714(S), for example the remote unit 714(1), can include the RF power management circuit 600 of FIG. 6 for improving linearity of a power amplifier in the selected remote unit. The notation "1-S" indicates that any number of the referenced component 1-S may be provided.

Remote unit O/E converters provided in the remote units 714(1)-714(S) convert the downlink optical fiber-based communications signals 710D(1)-710D(R) back into the downlink digital communications signals 706D(1)-706D(R), which are the converted into a plurality of downlink RF communications signals 715D(1)-715D(S) and provided to antennas 716(1)-716(S) in the remote units 714(1)-714(S) to client devices in the reception range of the antennas 716(1)-716(S).

In this regard, in the selected remote unit 714(1), the DPD circuit 606 of FIG. 6 receives a selected downlink digital communications signal among the downlink digital communications signals 706D(1)-706D(R). The DAC 618 converts the selected downlink digital communications signal into a selected downlink RF communications signal among the downlink RF communications signals 715D(1)-715D(S). The frequency up-converter 620 converts the selected downlink RF communications signal from a baseband frequency to a carrier frequency. The power amplifier 604 amplifies the selected downlink RF communications signal. The high-directivity directional coupler 300 receives and provides the downlink RF communications signal to the antenna 610 for distribution to the client devices.

The remote units 714(1)-714(S) receive a plurality of uplink RF communications signals 715U(1)-715U(S) from the client devices through the antennas 716(1)-716(S). The remote units 714(1)-714(S) covert the uplink RF communications signals 715U(1)-715U(S) into a plurality of uplink digital communications signals. Remote unit E/O converters are also provided in the remote units 714(1)-714(S) to convert the uplink digital communications signals into a plurality of uplink optical fiber-based communications signals 710U(1)-710U(S). The remote units 714(1)-714(S) communicate the uplink optical fiber-based communications signals 710U(1)-710U(S) over an uplink optical fiber-based communications medium 712U to the OIMs 708(1)-708(N) in the central unit 704. The OIMs 708(1)-708(N) include O/E converters that convert the received uplink optical fiber-based communications signals 710U(1)-710U(S) into uplink digital communications signals 720U(1)-720U(S), which are processed by the RIMs 702(1)-702(M) and provided as the uplink digital communications signals 720U(1)-720U(S). The central unit 704 may provide the uplink digital communications signals 720U(1)-720U(S) to a base station or other communications system.

Note that the downlink optical fiber-based communications medium 712D and the uplink optical fiber-based communications medium 712U connected to each of the remote units 714(1)-714(S) may be a common optical fiber-based communications medium, wherein for example, wave division multiplexing (WDM) is employed to provide the downlink optical fiber-based communications signals 710D(1)-710D(R) and the uplink optical fiber-based communications signals 710U(1)-710U(S) on the same optical fiber-based communications medium.

Figure 8:
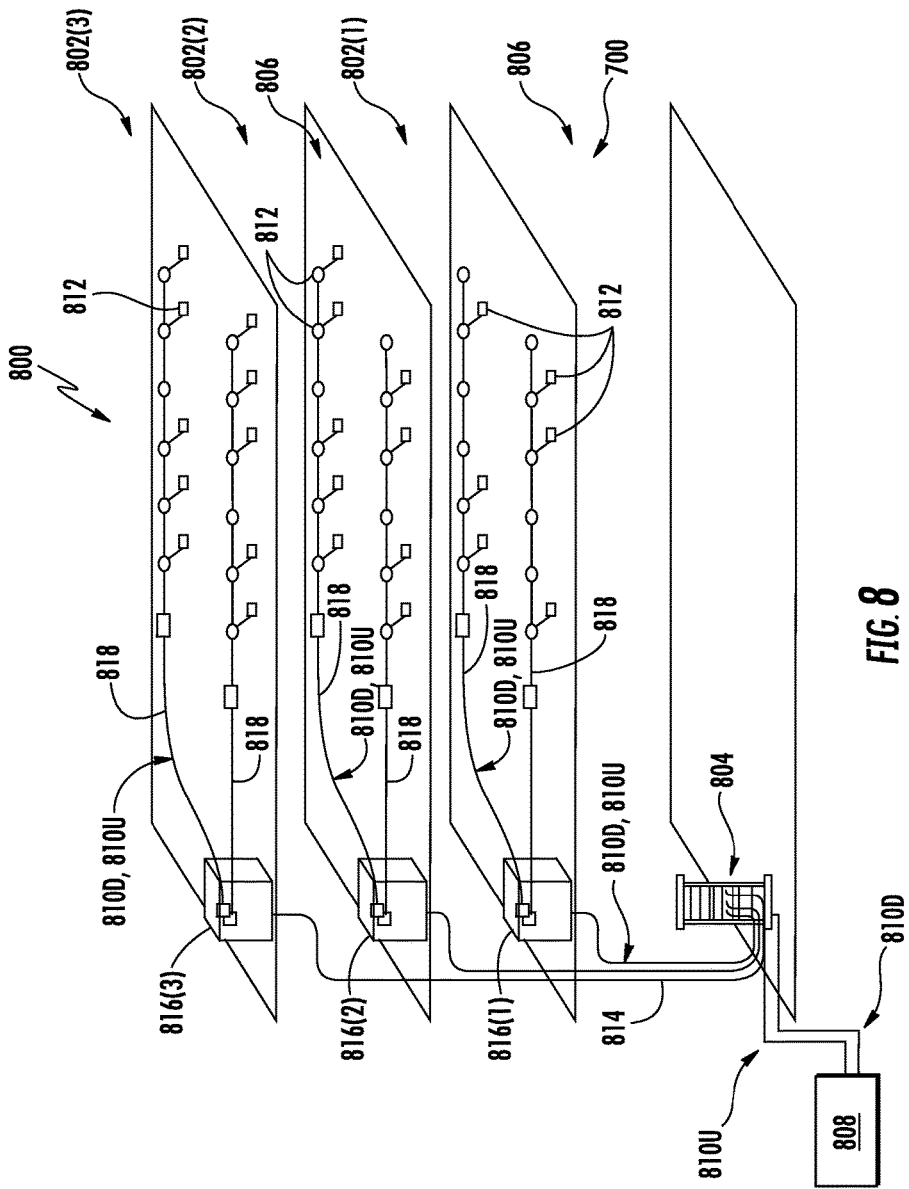
FIG. 8 is a partial schematic cut-away diagram of an exemplary building infrastructure in which a WDS, such as the WDS of FIG. 7, includes a remote unit that employs the high-directivity directional coupler of FIG. 3A to provide linearity improvement in a power amplifier in the remote unit.

The WDS 700 of FIG. 7 may be provided in an indoor environment, as illustrated in FIG. 8. FIG. 8 is a partial schematic cut-away diagram of an exemplary building infrastructure 800 in which a WDS, such as the WDS 700 of FIG. 7, includes a remote unit that employs the high-directivity directional coupler 300 of FIG. 3A to provide linearity improvement in a power amplifier in the remote unit. The building infrastructure 800 in this embodiment includes a first (ground) floor 802(1), a second floor 802(2), and a third floor 802(3). The floors 802(1)-802(3) are serviced by a central unit 804 to provide antenna coverage areas 806 in the building infrastructure 800. The central unit 804 is communicatively coupled to a base station 808 to receive downlink communications signals 810D from the base station 808. The central unit 804 is communicatively coupled to a plurality of remote units 812 to distribute the downlink communications signals 810D to the remote units 812 and to receive uplink communications signals 810U from the remote units 812, as previously discussed above. The downlink communications signals 810D and the uplink communications signals 810U communicated between the central unit 804 and the remote units 812 are carried over a riser cable 814. The riser cable 814 may be routed through interconnect units (ICUs) 816(1)-816(3) dedicated to each of the floors 802(1)-802(3) that route the downlink communications signals 810D and the uplink communications signals 810U to the remote units 812 and also provide power to the remote units 812 via array cables 818.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A high-directivity directional coupler, comprising:
   a substrate;
   a ground plane disposed underneath the substrate;
   an input port configured to receive an input signal;
   an output port configured to output the received input signal as an output signal;
   a coupled port configured to output a coupled signal proportional to the input signal;
   an isolated port configured to provide isolation to the input signal and the coupled signal;

a first microstrip disposed above the substrate, the first microstrip configured to convey the input signal from the input port to the output port; and a second microstrip disposed above the substrate parallel to the first microstrip, the second microstrip configured to:

provide a linear forward path for conveying an even mode current from the coupled port to the ground plane; and provide a non-linear return path longer than the linear forward path for conveying an odd mode current in an opposite direction from the even mode current.

2. The high-directivity directional coupler of claim 1, wherein the non-linear return path is configured to compensate for an inequality between an odd mode phase velocity of the odd mode current and an even mode phase velocity of the even mode current.

3. The high-directivity directional coupler of claim 2, wherein the non-linear return path is further configured to delay the odd mode current to cause the odd mode current to be substantially cancelled out by the even mode current.

4. The high-directivity directional coupler of claim 1, wherein the second microstrip comprises a plurality of rectangular-shaped stubs disposed adjacent to the first microstrip, each of the plurality of rectangular-shaped stubs is separated from an adjacent rectangular-shaped stub among the plurality of rectangular-shaped stubs by a separation distance.

5. The high-directivity directional coupler of claim 4, wherein each of the plurality of rectangular-shaped stubs has a respective width that is less than or equal to sixty percent of the separation distance.

6. The high-directivity directional coupler of claim 4, wherein the non-linear return path is formed along outer edges of the plurality of rectangular-shaped stubs.

7. A method for fabricating a high-directivity directional coupler, comprising:

providing a substrate;

providing a ground plane underneath the substrate;

providing an input port configured to receive an input signal;

providing an output port configured to output the received input signal as an output signal;

providing a coupled port configured to output a coupled signal proportional to the input signal;

providing an isolated port configured to provide isolation to the input signal and the coupled signal;

disposing a first microstrip above the substrate, the first microstrip configured to convey the input signal from the input port to the output port; and disposing a second microstrip above the substrate parallel to the first microstrip, the second microstrip configured to:

provide a linear forward path for conveying an even mode current from the coupled port to the ground plane; and provide a non-linear return path longer than the linear forward path for conveying an odd mode current in an opposite direction from the even mode current.

8. The method of claim 7, further comprising compensating for an inequality between an odd mode phase velocity of the odd mode current and an even mode phase velocity of the even mode current.

9. The method of claim 8, further comprising delaying the odd mode current to cause the odd mode current to be substantially cancelled out by the even mode current.

10. The method of claim 7, further comprising:

disposing a plurality of rectangular-shaped stubs on the second microstrip adjacent to the first microstrip; and separating each rectangular-shaped stub from an adjacent rectangular-shaped stub among the plurality of rectangular-shaped stubs by a separation distance.

11. A wireless distribution system (WDS), comprising:

a plurality of remote units configured to:

receive and convert a plurality of downlink digital communications signals into a plurality of downlink radio frequency (RF) communications signals for distribution to client devices; and receive a plurality of uplink RF communications signals from the client devices and convert the plurality of uplink RF communications signals into a plurality of uplink digital communications signals; and a central unit configured to:

distribute the plurality of downlink digital communications signals to the plurality of remote units; and receive the plurality of uplink digital communications signals from the plurality of remote units;

wherein at least one selected remote unit among the plurality of remote units comprises a high-directivity directional coupler, comprising:

a substrate;

a ground plane disposed underneath the substrate;

an input port configured to receive an input signal;

an output port configured to output the received input signal as an output signal;

a coupled port configured to output a coupled signal proportional to the input signal;

an isolated port configured to provide isolation to the input signal and the coupled signal;

a first microstrip disposed above the substrate, the first microstrip configured to convey the input signal from the input port to the output port; and a second microstrip disposed above the substrate parallel to the first microstrip, the second microstrip configured to:

provide a linear forward path for conveying an even mode current from the coupled port to the ground plane; and provide a non-linear return path longer than the linear forward path for conveying an odd mode current in an opposite direction from the even mode current.

12. The WDS of claim 11, wherein the at least one selected remote unit further comprises:

a power amplifier coupled to the input port of the high-directivity directional coupler and configured to amplify a selected downlink RF communications signal among the plurality of downlink RF communications signals; and an antenna coupled to the output port of the high-directivity directional coupler and configured to distribute the selected downlink RF communications signal to the client devices.

13. The WDS of claim 12, wherein the at least one selected remote unit further comprises:

a digital pre-distortion (DPD) circuit configured to provide linearity correction in a selected downlink digital communications signal among the plurality of downlink digital communications signals based on a digital feedback signal received via a feedback path;

a digital-to-analog converter (DAC) configured to convert the selected downlink digital communications signal into the selected downlink RF communications signal; and a frequency up-converter configured to convert the selected downlink RF communications signal from a baseband frequency to a carrier frequency and provide the selected downlink RF communications signal to the power amplifier.

14. The WDS of claim 13, wherein the feedback path is configured to receive an RF feedback signal via the coupled port of the high-directivity directional coupler.

15. The WDS of claim 14, wherein the feedback path comprises:
 a frequency down-converter configured to convert the RF feedback signal from the carrier frequency to the baseband frequency; and
 an analog-to-digital converter (ADC) configured to convert the RF feedback signal to the digital feedback signal and provide the digital feedback signal to the DPD circuit.

16. The WDS of claim 12, wherein the non-linear return path is further configured to delay the odd mode current to cause the odd mode current to be substantially cancelled out by the even mode current.

17. The WDS of claim 11, wherein the non-linear return path is configured to compensate for an inequality between an odd mode phase velocity of the odd mode current and an even mode phase velocity of the even mode current.

18. The WDS of claim 11, wherein the second microstrip comprises a plurality of rectangular-shaped stubs disposed adjacent to the first microstrip, each of the plurality of rectangular-shaped stubs is separated from an adjacent rectangular-shaped stub among the plurality of rectangular-shaped stubs by a separation distance.

19. The WDS of claim 18, wherein each of the plurality of rectangular-shaped stubs has a respective width that is less than or equal to sixty percent of the separation distance.

20. The WDS of claim 19, wherein the non-linear return path is formed along outer edges of the plurality of rectangular-shaped stubs.

21. The WDS of claim 11, wherein:
 the central unit comprises electrical-to-optical (E/O) converters configured to convert the plurality of downlink digital communications signals into a plurality of downlink optical fiber-based communications signals for distribution to the plurality of remote units over a downlink optical fiber-based communications medium;
 the plurality of remote units comprises:
  remote unit optical-to-electrical (O/E) converters configured to convert the plurality of downlink optical fiber-based communications signals into the plurality of downlink digital communications signals; and
  remote unit E/O converters configured to convert the plurality of uplink digital communications signals into a plurality of uplink optical fiber-based communications signals; and
 the central unit further comprises O/E converters configured to convert the plurality of uplink optical fiber-based communications signals received from the plurality of remote units over an uplink optical fiber-based communications medium into the plurality of uplink digital communications signals.

* * * * *